United States Patent [19]

Miller et al.

[11] Patent Number: 4,506,065

[45] Date of Patent: Mar. 19, 1985

[54] COPOLYESTERCARBONATES

[75] Inventors: Kenneth F. Miller, Mt. Vernon; Edward L. Belfoure, New Harmony, both of Ind.

[73] Assignee: General Electric Company, Mt. Vernon, Ind.

[21] Appl. No.: 567,816

[22] Filed: Jan. 3, 1984

[51] Int. Cl.$^3$ ............................................. C08G 63/64
[52] U.S. Cl. ................................. 528/194; 528/173; 528/176
[58] Field of Search .................... 528/176, 194, 173

[56] References Cited

U.S. PATENT DOCUMENTS

| | | | |
|---|---|---|---|
| 3,030,331 | 4/1962 | Goldberg | 528/194 |
| 3,169,121 | 2/1965 | Goldberg | 528/194 |
| 3,207,814 | 9/1965 | Goldberg | 528/194 |
| 4,238,596 | 12/1980 | Quinn | 528/194 |
| 4,238,597 | 12/1980 | Markezich et al. | 528/194 |
| 4,260,731 | 4/1981 | Mori et al | 528/194 |
| 4,355,150 | 10/1982 | Bosnyak et al. | 528/176 |

FOREIGN PATENT DOCUMENTS 55-131048  12/1981  Japan .................................... 528/194

*Primary Examiner*—Lester L. Lee
*Attorney, Agent, or Firm*—John Schneller; Martin B. Barancik

[57] ABSTRACT

A copolyestercarbonate composition, comprising:
a dihydric phenol,
a carbonate precursor, and
an aromatic dicarboxylic acid or derivative thereof selected from the group consisting of terephthalic acid and acid derivatives, and a mixture of isophthalic and terephthalic acids, and acid derivatives with the mole ratio of isophthalic to terephthalic of about 0.1:9.9 to about 3:7
said copolyestercarbonate containing from about 20 mole percent to about 50 mole percent ester content.

4 Claims, No Drawings

COPOLYESTERCARBONATES

FIELD OF THE INVENTION

The invention relates to thermoplastic resin compositions, and more particularly to copolyesters containing both carbonate groups and carboxylate groups in the chain, and having exceptional thick section impact strength.

BACKGROUND OF THE INVENTION

Aromatic copolyestercarbonates are well known as copolymers derived from carbonate precursors, dihydric phenols, and aromatic dicarboxylic acid or acid derivatives and are described for example in U.S. Pat. Nos. 3,030,331; 3,169,121 and 3,207,814, all of which are hereby incorporated by reference. Among the properties characterizing these polymers is a relatively high distortion temperature under load (DTUL) as well as a relatively high impact strength as measured by a notched Izod test system. The impact failure mode, however, for both the thin and thick test pieces is often brittle rather than ductile.

Aromatic polycarbonates are also well known polymers derived from carbonate precursors and dihydric phenols. Among the properties characterizing these polymers is a DTUL significantly lower than an aromatic polyestercarbonate and a high resistance to impact in thin sections. In addition, the impact failure mode for thin section test pieces is ductile rather than brittle. However, aromatic polycarbonates have a critical thickness beyond which impact strength drops quite rapidly and the impact failure mode changes from ductile to brittle. The notched Izod test system described in ASTM standard D256 utilizing 6.4 mm test samples is beyond such critical thickness for aromatic polycarbonates. Thus impact failure tests for aromatic carbonates utilizing 6.4 mm test samples show a brittle failure mode and a relatively low impact strength.

SUMMARY OF THE INVENTION

It has now been found that certain copolyestercarbonates, containing a certain ratio of carbonate groups to carboxylate groups and a certain ratio of terephthalate to isophthalate groups in the chain of the copolyestercarbonate, exhibit an impact resistance which is higher than either polycarbonate or an aromatic copolyestercarbonate with higher levels of ester content as measured by the 6.4 mm notched Izod test. Surprisingly, the impact failure mode tends to be more ductile in some of the copolyestercarbonates of this invention.

In accordance with the invention, there is provided an aromatic copolyester carbonate derived from a dihydric phenol, a carbonate precursor, and an aromatic dicarboxylic acid or derivative thereof selected from the group consisting of terephthalic acid or a mixture of isophthalic and terephthalic acids.

Preferred copolyestercarbonates of the invention will also exhibit a tendency to break in the ductile failure mode rather than the brittle failure mode in thick sections, viz. sections greater than or equal to 6.4 mm. In contrast, comparable polycarbonates or copolyestercarbonates, prepared in the same manner from either a carbonate precursor or an aromatic dicarboxylic acid or derivative thereof, exhibit a brittle failure mode.

DETAILED DESCRIPTION OF THE INVENTION

Typical dihydric phenols which can be employed to prepare copolyestercarbonates of the invention are:
2,2-bis(4-hydroxyphenyl)propane (also known as bisphenol-A);
2,4'-dihydroxydiphenyl)methane;
bis(2-hydroxyphenyl)methane;
bis(4-hydroxyphenyl)methane;
bis(4-hydroxyphenyl-5-propylphenyl)methane;
bis(4-hydroxy-2,6-dimethyl-3-methoxyphenyl)methane;
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.
Bisphenols other than those having a carbon atom between the two phenols can also be used. Examples of such bisphenols include bis(hydroxyphenyl)sulfides, bis(hydroxyphenyl)ethers, and bis(hydroxyphenyl)sulfoxides, and the like. The preferred family of dihydric phenols is illustrated below:

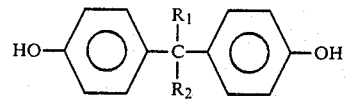

The aromatic copolyestercarbonates suitable for use in the present invention are derived from carbonate precursors and dihydric phenols which are also useful in the preparation of a comparable aromatic polycarbonate. However, more than one appropriate dihydric phenol, as discussed above, may be used to prepare copolyestercarbonates of the invention. The aromatic dicarboxylic acid employed in the preparation of the copolyester carbonate is preferably terephthalic acid or mixtures of isophthalic and terephthalic acid. Any ester forming derivative of a carboxylic acid which is reactive with the hydroxyl of a dihydric phenol may be employed. The acid halides are generally employed because of their ease of reactivity and availability. The acid chlorides are preferred.

The ester content of the aromatic copolyestercarbonate should preferably be in the range from about 20 to about 50 mole percent, preferably from about 25 to about 45 mole percent. Most preferably, the copolymers of the present invention exhibit 6.4 mm impact failure in the ductile mode and have an ester content from about 25 to about 36 mole percent. When a mixture of isophthalic and terephthalic acids are present in the polymer, a range of from about 0.1:9.9 to 3:7 isophthalic to terephthalic acid can be employed. A preferred range is from about 0.5:9.5 to 2:8.

The standard methods for preparing copolyestercarbonate can be employed. Such methods are found, for example in U.S. Pat. Nos. 4,238,596 and 4,238,597, which are incorporated herein by reference.

Additionally various stabilizers and additives may also be present in the composition. Typical stabilizers may be employed for color, thermal, hydrolytic and ultraviolet stabilization of the copolyestercarbonates of the present invention. Various additives such as mold release agents, pigments, flame retardants, may also be present.

SPECIFIC EXAMPLES

In order that those skilled in the art may better understand how the present invention may be practiced, the following examples are given by way of illustration and not by way of limitation. All parts and percentages are by weight unless otherwise noted.

PREPARATION OF A COPOLYESTERCARBONATE RESIN

To a reactor fitted with a mechanical agitator are charged 10 liters of deionized water, 16 liters of methylene chloride, 1,910 grams (8.36 moles) of bisphenol-A, 24 milliliters of triethylamine, 3.4 grams of sodium gluconate and 65 grams (0.43 mole) of paratertiary butyl phenol. This reaction mixture is stirred and to the stirred reaction mixture are added, over a 15 minute period, a mixture of 926 grams of terephthaloyl dichloride and 163 grams of isophthaloyl dichloride as a 25 weight percent solids solution in methylene chloride. During the acid chloride addition the pH is maintained in the range of 8.5–11.5 by the addition of 25% aqueous sodium hydroxide. The resulting mixture is phosgenated by the introduction of phosgene at the rate of 36 grams per minute for 15 minutes with the pH controlled at 9.5 to 12 by the addition of aqueous sodium hydroxide solution. After phosgenation is terminated 6 liters of methylene chloride are added, the brine layer is separated by centrifuge and the resin solution is washed with aqueous acid and with water. The resin is steam precipitated and dried in a nitrogen fluid bed drier at approximately 116° C. This resin product is then fed to an extruder operating at a temperature of about 315° C. to extrude the resin into strands and the extruded strands are chopped into pellets. The pellets are then injection molded at about 326° C. into test samples measuring about 6.25 cm×12.8 mm×3.2 mm and 6.25 cm×12.8 mm×6.4 mm. The heat distortion temperature under load (DTUL) of these test samples is determined according to modified ASTM D-648 test method.

Also determined for the copolyestercarbonate resin is the Kasha Index (KI) which is an indication or measure of the processability of the resin, i.e., the lower the KI the greater the melt flow rate and, therefore, the easier the processability. Basically, the Kasha Index is a measurement of the melt viscosity of the resin. The procedure for determining the Kasha Index is as follows: 7 grams of resin pellets, dried a minimum of 90 minutes at 125° C. are added to a modified Tinius-Olsen model T3 melt indexer; the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs. The time required for the plunger to travel 5.1 cm is measured in centiseconds; this is reported as the KI. The higher the KI, the higher the melt viscosity and the more viscous the resin, and the harder or more difficult the processability.

Table I describes fifteen copolyestercarbonate compositions prepared in the method described above but with varying quantities of components. For each composition the mole percent ester content is given together with the mole ratio of terephthalic acid to isophthalic acid. The notched Izod impact strength, the distortion temperature under load (DTUL), and the Kasha Index were also measured for each composition. The data are reported below in Table I.

TABLE I

| EXAMPLE | MOLE % ESTER CONTENT | MOLE RATIO TPA/IPA | NOTCHED IZOD IMPACT STRENGTH (kgf. cm/cm) 6.4mm | 3.2mm | DTUL (°C.) | KI (CENTISECONDS) |
|---|---|---|---|---|---|---|
| 1 | 51.6 | 85/15 | $36^0$ | $44^0$ | 160.8 | 44270 |
| 2 | 39.6 | 85/15 | $48^0$ | $58^{100}$ | 156.7 | 27650 |
| 3 | 36.7 | 85/15 | $46^0$ | $55^{100}$ | 155.1 | 18680 |
| 4 | 35.8 | 85/15 | $52^{100}$ | $61^{100}$ | 152.2 | 19750 |
| 5 | 26.8 | 85/15 | $65^{100}$ | $69^{100}$ | 148.5 | 20440 |
| 6 | 20.0 | 85/15 | $33^0$ | $79^{100}$ | 145.1 | 11820 |
| 7 | 0 | 0/0 | $10^0$ | $87^{100}$ | 132.5 | 3040 |
| 8 | 61.2 | 85/15 | $31^0$ | $33^0$ | 167.3 | 42270 |
| 9 | 63.5 | 85/15 | $31^0$ | $33^0$ | 170.3 | 62890 |
| 10 | 70.4 | 0/100 | $11^0$ | $44^0$ | 162.5 | 45950 |
| 11 | 41.5 | 0/100 | $9.2^0$ | $54^0$ | 146.0 | 17360 |
| 12 | 41.5 | 100/0 | $40^0$ | $47^0$ | 157.3 | 70685 |
| 13 | 44.4 | 100/0 | $10_{50}{}^{100}$ | $50^{100}$ | 161.9 | 64880 |
| 14 | 43.5 | 7/93 | $13^0$ | $69^{100}$ | 156.1 | 24740 |
| 15 | 37.7 | 85/15 | $50^0$ | $60^{100}$ | 148.5 | 13640 |

The results demonstrate that the copolyestercarbonate compositions of the invention exhibit exceptional thick section impact strength. It is also noted from the data that compositions with high isophthalate content do not exhibit good thick section impact.

What is claimed is:

1. A copolyestercarbonate composition comprising the reaction product of a dihydric phenol, a carbonate precursor and a mixture of isophthalic acid or isophthalic ester forming derivative and terephthalic acid or terephthalic acid ester forming derivative; the mole ratio of isophthalate to terephthalate in the copolyestercarbonate being about 0.5:9.5 to 2:8 and the ester content in the copolyestercarbonate varying from about 25 to 45 mole percent.

2. The composition of claim 1 wherein the ester content of the copolyestercarbonate is from about 25 to 36 mole percent.

3. The composition of claim 1 wherein the ester forming derivative of the isophthalic and terephthalic acid is employed.

4. The composition of claim 2 wherein an ester forming derivative of the isophthalic and terephthalic acid is employed.

* * * * *